(12) United States Patent
Liang

(10) Patent No.: US 10,415,265 B1
(45) Date of Patent: Sep. 17, 2019

(54) CONVERTIBLE PROTECTIVE SHELTER

(71) Applicant: Gang Liang, Richmond (CA)

(72) Inventor: Gang Liang, Richmond (CA)

( * ) Notice: Subject to any disclaimer, the term of this patent is extended or adjusted under 35 U.S.C. 154(b) by 0 days.

(21) Appl. No.: 15/926,049

(22) Filed: Mar. 20, 2018

(51) Int. Cl.
*E04H 9/02* (2006.01)
*E04H 9/14* (2006.01)
*E04H 15/30* (2006.01)
*E04H 1/12* (2006.01)

(52) U.S. Cl.
CPC ............. *E04H 9/029* (2013.01); *E04H 1/125* (2013.01); *E04H 9/14* (2013.01); *E04H 15/30* (2013.01)

(58) Field of Classification Search
CPC .......... E04H 9/029; E04H 1/125; E04H 9/14; E04H 15/30
USPC .................................. 52/66, 71, 72, 79.5, 86
See application file for complete search history.

(56) References Cited

U.S. PATENT DOCUMENTS

| | | | | |
|---|---|---|---|---|
| 2,733,482 A * | 2/1956 | Doman et al. | ........... | E04B 1/344 135/143 |
| 2,874,812 A * | 2/1959 | Clevett, Jr. | ............. | E04C 3/005 182/163 |
| 3,260,022 A * | 7/1966 | Guyer | ...................... | A41G 1/04 52/105 |
| 3,932,969 A * | 1/1976 | Matras | ................... | E04B 1/166 52/86 |
| 4,071,986 A * | 2/1978 | Wickwire | ................. | E04B 1/32 52/81.5 |
| 4,284,094 A * | 8/1981 | Behrend | ................. | E04H 15/48 135/123 |
| 4,887,397 A * | 12/1989 | Peterson | ................. | E04H 15/18 52/86 |
| 4,894,962 A * | 1/1990 | Conn | .................... | E04B 1/3205 52/108 |
| 4,955,168 A * | 9/1990 | Barry | ..................... | E06B 1/006 52/210 |
| 5,218,801 A * | 6/1993 | Hereford | ................. | E04B 7/022 52/223.9 |
| 5,417,027 A * | 5/1995 | Wagenet | .................. | A63B 9/00 446/125 |
| 5,588,265 A * | 12/1996 | Gill | .......................... | E04H 9/02 52/167.1 |
| 6,360,492 B1* | 3/2002 | Ross | ......................... | E04H 6/44 135/124 |
| 6,871,686 B2* | 3/2005 | Eshpar | .................... | E04F 10/08 160/231.1 |
| 6,931,797 B2* | 8/2005 | Drew | ....................... | E01D 4/00 405/262 |
| 7,025,019 B2* | 4/2006 | Axelrod | ............... | A01K 1/0245 119/499 |
| 8,079,328 B2* | 12/2011 | Lott | ...................... | A01K 1/0245 119/453 |

(Continued)

*Primary Examiner* — Joshua K Ihezie

(57) ABSTRACT

A convertible protective shelter for people to shelter and stay in during unsafe situations, such as earthquakes and windstorms. The shelter can protect occupants from falling materials or debris. This shelter is readily convertible into a table for general household use when it is not required, and can be readily deployed when it is required. A plurality of elongate support members which form the arched structure of the shelter may be converted into leg structures for the undeployed shelter (table). The shelter can also be provided with at least one protective door, which optionally can be foldable to facilitate storage of the protective door when the shelter is not in use.

9 Claims, 5 Drawing Sheets

(56) References Cited

U.S. PATENT DOCUMENTS

| | | | | |
|---|---|---|---|---|
| 8,082,700 B2* | 12/2011 | Kennedy | ............... | E04B 1/3205 |
| | | | | 135/124 |
| 8,235,008 B2* | 8/2012 | Axelrod | ............... | A01K 1/0245 |
| | | | | 119/499 |
| 9,340,243 B2* | 5/2016 | Williams | .................. | B60P 3/32 |
| 2001/0052356 A1* | 12/2001 | Ross | ......................... | E04H 6/44 |
| | | | | 135/124 |
| 2003/0145530 A1* | 8/2003 | James | ...................... | E04H 9/10 |
| | | | | 52/86 |
| 2005/0055893 A1* | 3/2005 | Goodwin | ............... | E04H 15/06 |
| | | | | 52/79.1 |
| 2009/0188539 A1* | 7/2009 | Hollinger | ............... | E04H 15/22 |
| | | | | 135/115 |
| 2009/0235593 A1* | 9/2009 | Carroll | .................... | F24S 25/10 |
| | | | | 52/86 |
| 2010/0024320 A1* | 2/2010 | Kanner | .................... | E01D 4/00 |
| | | | | 52/86 |
| 2012/0096804 A1* | 4/2012 | Gutierrez Tenreiro | ... | E01D 4/00 |
| | | | | 52/742.14 |
| 2012/0174497 A1* | 7/2012 | Kroes | .................... | E04C 2/405 |
| | | | | 52/71 |
| 2012/0174763 A1* | 7/2012 | Ritchie | .................... | E04H 9/10 |
| | | | | 89/36.04 |
| 2014/0311052 A1* | 10/2014 | Farmer | ............... | E04B 1/34357 |
| | | | | 52/79.5 |

\* cited by examiner

CONVERTIBLE PROTECTIVE SHELTER

FIELD OF THE INVENTION

The present invention relates to the field of protective shelters. More particularly, the present invention relates to the field of protective shelters that are convertible into items of furniture when not in use.

BACKGROUND OF THE INVENTION

The potential damage and risks which can be caused by natural disasters such as earthquakes, hurricanes, high winds, etc. is well known. During such natural disasters, usually the most common cause of injury and/or loss of life to people/pets is due to the structural collapse of buildings.

Previously, efforts to try to address this issue have included developing methods to reinforce buildings themselves, but this is still a gradual process of development, and around the world, whether in developing or developed countries, many houses and properties are still inadequately built to withstand earthquakes, hurricanes, etc.

There have also been various innovations created to prevent harm during such natural disasters. (One example is a bed board that will automatically collapse when an earthquake is detected, so that the person in the bed falls into a solid box, as well as desks that allow people to squat inside to avoid falling debris.) There are various shortcomings with these methods, including for example, discomfort to the user when used for extended periods of time, high cost of automation and mechanization, difficulties with accurately and quickly sensing an earthquake, and the inability to shelter multiple people at once.

SUMMARY OF THE INVENTION

Disclosed herein is a convertible protective shelter. The convertible protective shelter may be deployed within any building or structure, but it is contemplated that it would be most effectively used in low-rise buildings, such as independent houses, row houses, townhouses, or low-rise apartments. The shelter would typically be placed on the ground floor of a building. It can be widely used in urban and rural buildings, or in schools, hospitals, nursing and seniors' homes, etc.

The protective shelter provides a safe place for occupants to shelter in during natural disasters such as earthquakes, windstorms, and the like, in order to obtain protection from falling debris, etc. It is contemplated that the protective shelter can be made sufficiently spacious to allow occupants to stay/sleep in for an extended period (for example, following a mild earthquake occurring in the middle of the night, occupants can sleep in the shelter without having to worry unduly about potential mild aftershocks). As the protective shelter is a relatively large structure and takes up considerable space, it is contemplated that it would be advantageous to allow it to be convertible into an item of furniture for general use, when the shelter is not required.

Disclosed herein is a convertible protective shelter having a simple, arched structure. It is contemplated that the shelter can be an integral single unit, requiring no extra connection parts. The structure evenly distributes any potential impact force into the entire structure and is not reliant upon any hinge or load bearing point, which could potentially be a point of failure.

Disclosed herein is a protective shelter that provides a large space for an average family of between 3-5 people to remain in comfortably, for example while awaiting for updates on the situation or for help to arrive. The protective shelter would protect the occupants from downward impact of falling debris and from glass and other such debris which may ricochet upon impact with the ground. The shelter should be easily convertible to and from daily-use furniture, which in a preferred embodiment is a dining table. The conversion process (both from table into shelter and from shelter back into table) should ideally be achievable quickly and effortlessly. The materials used in the construction of the protective shelter should be high strength (so as to be impact resistant), yet preferably light-weight; suitable construction materials will be well known to one skilled in the art.

In accordance with an aspect of the present invention, disclosed herein is a convertible protective shelter, having a top surface, a lower surface, a first leg structure comprising a plurality of first support members, and a second leg structure comprising a plurality of second support members, wherein the lower surface is affixed to the top surface and situated therebelow, and the lower surface has a first edge and a second edge, the second edge being diametrically opposite the first edge, wherein each of the first and second support members is elongate, is substantially uniform along its length, and has a cross-section that is substantially trapezoid-shaped. A first upper support member of the plurality of first support members is pivotably connected to the first edge via an upper first hinged connection, and a second upper support member of the plurality of second support members is pivotably connected to the second edge via an upper second hinged connection, and each respective adjacent pair of first support members is pivotably connected via a respective hinged connection, and each respective adjacent pair of second support members is pivotably connected via a respective hinged connection. The protective shelter is configured to convert from an undeployed to a deployed position via pivotal rotation of the first support members about the first hinged connection and their respective hinged connections, and via pivotal rotation of the second support members about the second hinged connection and their respective hinged connections, thereby forming, together with the lower surface, a substantially arch-shaped arched structure, which defines a shelter space therebelow.

In accordance with another aspect of the present invention, the convertible protective shelter may be additionally provided with a first tensioning means configured to bias the lower surface with the first upper support member; a second tensioning means configured to bias the lower surface to the second upper support member, and a plurality of tensioning means configured to bias each pair of adjacent support members to each other.

In accordance with another aspect of the present invention, the convertible protective shelter may be additionally provided with at least one protective door pivotably engaged with the lower surface and situated below the arched structure, where the protective door is configured, when in a closed position, to close off one entrance to the shelter space, and when in an open position, to allow entry into and exit from the shelter space.

In accordance with another aspect of the present invention, the protective door is substantially arch shaped.

In accordance with another aspect of the present invention, the convertible protective shelter may be additionally provided with one or more securing means to help secure the protective door to one or more of the support members.

In accordance with another aspect of the present invention, the protective door is configured to be stowable under the lower surface and between the leg structures, when the protective shelter is not in use (in the undeployed position).

In accordance with another aspect of the present invention, the protective door is a folding door, configured to be foldable.

In accordance with another aspect of the present invention, the top surface and lower surface are integral with each other.

DETAILED DESCRIPTION OF THE INVENTION

A detailed description of one or more embodiments of the present invention is provided below along with accompanying figures that illustrate the principles of the invention. As such, this detailed description illustrates the present invention by way of example and not by way of limitation. The description will clearly enable one skilled in the art to make and use the invention, and describes several embodiments, adaptations, variations and alternatives and uses of the invention, including what is presently believed to be the best mode and preferred embodiment for carrying out the invention. It is to be understood that routine variations and adaptations can be made to the invention as described, and such variations and adaptations squarely fall within the spirit and scope of the invention. For the purpose of clarity, technical material that is known in the technical fields related to the invention has not been described in detail so that the invention is not unnecessarily obscured.

Figure 1:
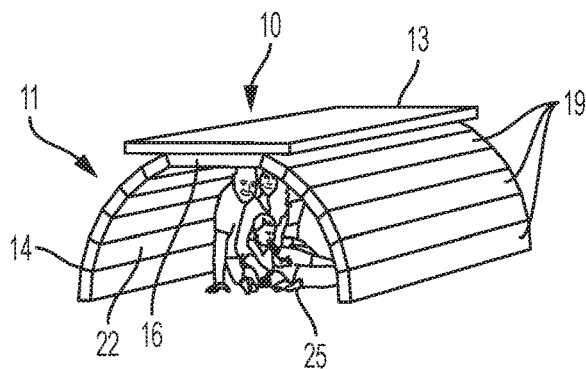
FIG. 1 is a perspective view of an exemplary embodiment of the convertible protective shelter of the present invention, in a deployed position.
Figure 2:
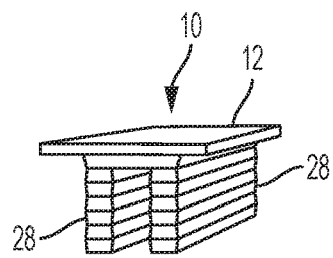
FIG. 2 is a perspective view of the convertible protective shelter, shown in an undeployed position.

The present invention relates to a convertible protective shelter for protecting the occupants against injury caused by the structural collapse of a building or by falling debris. As illustrated in FIG. 1, in the case of an earthquake or other such external hazards, one may quickly convert and deploy the exemplary protective shelter 10 from its daily use as an item of household furniture (i.e. a dining table as seen in FIG. 2) in order to provide protection for the occupants 25. The protective shelter 10 is generally constructed from high-strength and light-weight materials, as would be known to one skilled in the art. Suitable materials may include hard aluminum alloy (aluminum alloy profile), titanium alloy, glass-fibre and carbon fibre. From these figures, one may get an idea of the approximate contemplated dimensions of the present invention, although it is to be understood that different sizes and proportions are possible (for example, the shelter could be sized for a single individual, say a family of 4 or even for larger groups).

In the case of earthquakes, there is usually limited ability to accurately predict the timing of an earthquake. Further, injuries can often occur during aftershocks, which are also difficult to anticipate and predict, and which in some cases can occur long after the initial earthquake event. Thus, an appropriate shelter must be one which can be comfortable to stay within, potentially for prolonged periods of time, while awaiting news or waiting for help to arrive.

A safety shelter generally has to be appropriately bulky, which will generally render it difficult or inconvenient to place within a building or home. To address this problem, as mentioned above, the present invention is configured to be readily convertible. FIG. 1 and FIG. 2 illustrate the shape of the present invention in its deployed 11 and undeployed states 12, respectively. The convertible protective shelter 10, when in a deployed position 11, comprises a top surface 13 and a generally arched structure 14 which supports the top surface 13. The arched structure 14 may be in the form of a semi-circular arch. The arched structure 14 is formed from a plurality of support members 19. The arched structure 14 defines a shelter space 22, within which occupants 25 may take shelter. Thus, the present invention makes use of the property of arches, which are generally understood in construction to be particularly strong. The cross-section of each of the support members 19 is generally shaped as a trapezoid or wedge. Each of such trapezoids form the voussoirs of the arched structure 14.

Figure 3:
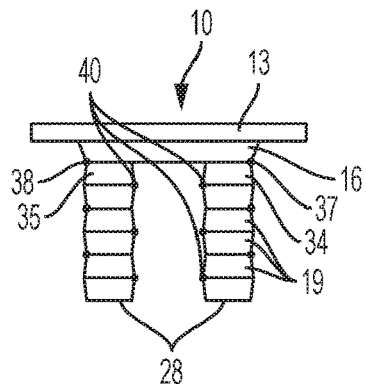
FIG. 3 is a side view showing a simplified representation of the convertible protective shelter in an undeployed position.
Figure 4:
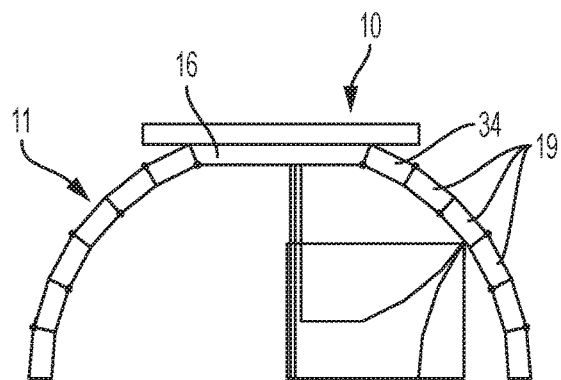
FIG. 4 is a side view showing a simplified representation of the convertible protective shelter in a deployed position.

As may be seen in FIG. 3 and FIG. 4, the plurality of support members 19 form the leg structures 28 for the protective shelter 10, when the protective shelter is converted into an undeployed position 12 (as a dining table). The shelter, in its undeployed configuration 12, is unobtrusive, and may be considered of elegant and aesthetically-pleasing design; further, as contemplated, it can function as, and will appear to be, any typical dining table. The top surface 13 is affixed to a lower surface 16 therebelow. The top surface 13 serves as the work surface or table-top of the protective shelter when in the undeployed position (i.e. of the table). In some embodiments, the top surface 13 and the lower surface 16 may be integral with each other. Since the support members 19 make up the leg structures 28 when the protective shelter is undeployed, it should be understood that the support members 19 generally need to be moderately thick so that the leg structures is suitably tall in order to raise up the top surface 13 and lower surface 16 and provide a suitable shelter space; the support members 19 also have to be moderately thick so that when the protective shelter 10 is deployed, each support member 19 is able to abut adjacent support members, and provide stability for the arched structure 14. In the exemplary embodiment in FIG. 3, each of the leg structures 28 are shown as being made up of a set of six support members 19 on each side.

Figure 7A:
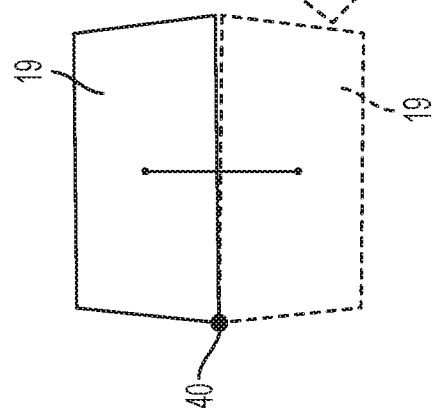
FIGS. 7A, 7B, 7C, 7D and 7E are simplified representations illustrating the configurations of a pair of adjacent support members as the convertible protective shelter converts from an undeployed position to a deployed position.
Figure 7B:
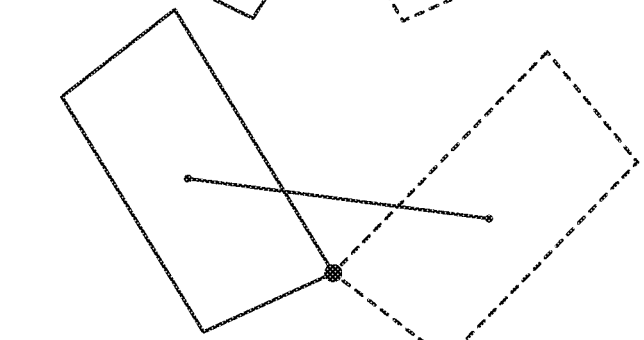
Figure 7C:
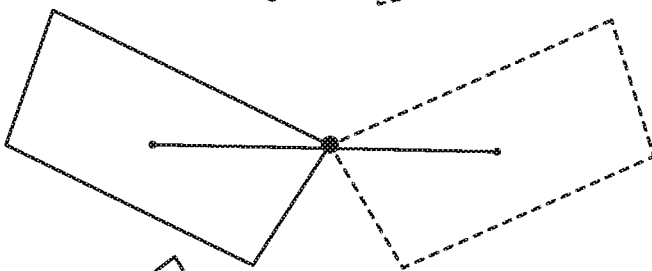
Figure 7D:
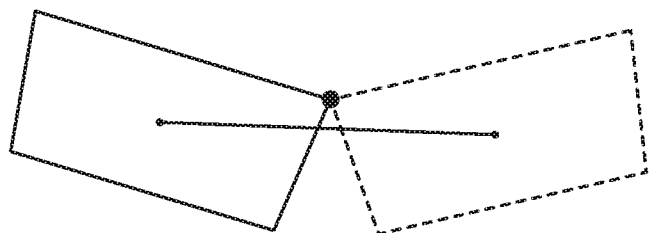
Figure 7E:
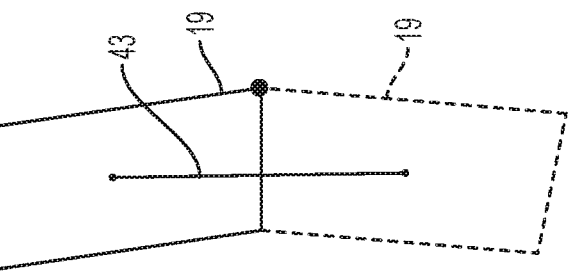

A pair of upper support members 34, 35, which are the two support members of the plurality of support members 19 that are situated nearest the lower surface 16, either side thereof, are pivotably connected to the lower surface 16 via hinge connections 37 and 38, respectively. Each of the plurality of support members 19 is also pivotably connected to its adjacent support member or support members (as the case may be) via respective hinge connections 40. Each of the plurality of support members 19 may be pivotably rotated through the hinge connections 37, 38 or hinge connections 40, as applicable, in order to convert the protective shelter 10 from a deployed position 11 into an undeployed position 12, and vice versa. When the protective shelter 10 is in the undeployed position 12, each of the two leg structures 28 (each of which is made up of a set of support members), take the form of a Z-folded or accordion structure. Each of the sets of support members "fold" together in accordion fashion, i.e. each successive support member in the chain alternates between a clockwise pivot and an anticlockwise pivot about each successive hinge connection 40. It is to be understood that each of the hinge connections 37, 38, 40 may be in the form of a single hinge or a plurality of hinges, located generally along the length of the hinge connection. The hinge connections may be in the form of spring hinges. This conversion mechanism can also be seen in FIGS. 7A-7E, where the relative rotation motion of a pair of support members about a hinge connection 40 is shown, from an undeployed position (FIG. 7A), through intermediate positions, through to a fully deployed position (FIG. 7E). According to another aspect, the hinge connections 37, 38, 40 may be formed by bonding high strength carbon fiber fabric between adjacent support members using epoxy resin, allowing the support members freedom of movement while still being connected to each other.

Figure 5:
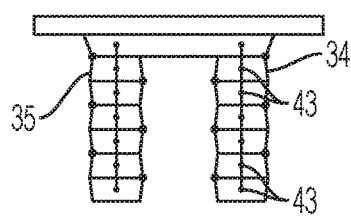
FIG. 5 is a sectional side view showing a simplified representation of the convertible protective shelter in an undeployed position, showing the locations of the tension assisted springs.
Figure 6:
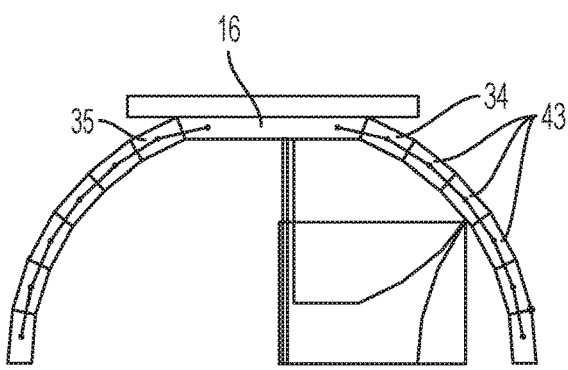
FIG. 6 is a sectional side view showing a simplified representation of the convertible protective shelter in a deployed position, showing the exemplary locations of the tension assisted springs.

In a preferred embodiment of the convertible protective shelter 10, one or more tensioning means or tension-assisted springs 43 are installed between each adjacent pair of support members and between the upper support members 34, 35 and the lower surface 16. The tension-assisted springs 43 function to pull each pair of adjacent support members 19 (as well as each of the upper support members 34, 35 and the lower surface 16) together, thus helping to keep the support members either in a deployed position or in a undeployed following the conversion of the support shelter 10. Besides tension-assisted springs, other tensioning means may be used (which would be apparent to a person skilled in the art), including rubber tensioning bands. FIG. 5 is a simplified sectional side view of the convertible protective shelter 10 in an undeployed position, showing the locations of the tension assisted springs 43. FIG. 6 is a simplified sectional side view of the convertible protective shelter 10 in a deployed position, showing the locations of the tension-assisted springs 43. Referring to FIGS. 7A-7E, these are simplified representations illustrating the movement about a hinged connection 40 and the orientation, of a pair of adjacent support members 19, as the convertible protective shelter 10 goes from an undeployed position (FIG. 7A), through intermediate positions, through to a deployed position (FIG. 7E). As mentioned above, the tension-assisted spring 43 helps to keep the support members 19 either in a deployed position or in an undeployed position, as the case maybe, following the conversion of the support shelter 10. The tension-assisted springs 43 are generally located such that they connect the geometric centres of the cross-sections of adjacent support members 19.

Figure 8:
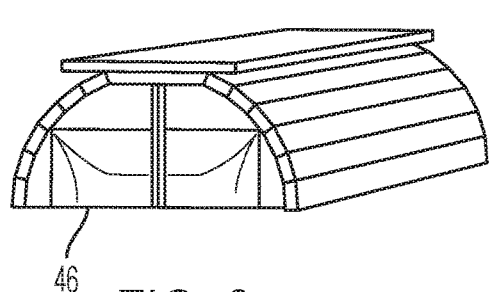
FIG. 8 is a perspective view of an embodiment of the convertible protective shelter in a deployed position, shown with a door also in a deployed position.

In accordance with another aspect of the present invention, disclosed herein is a convertible protective shelter 10, having one or two protective doors. FIG. 8 is a perspective view of an embodiment of the convertible protective shelter in a deployed position, shown installed with a generally semi-circular shaped protective door 46 also in a deployed position, thus closing off one of the side openings under the arched structure 14. Another protective door may be installed on the opposing side of the arched structure 14 (not shown). The protective door(s) has several roles. Firstly, it helps to enhance the structural stability of the arched structure 14 against top down impact force. Secondly, it protects the occupants from any debris (such as glass) which may ricochet after impact with the ground.

Figure 9A:
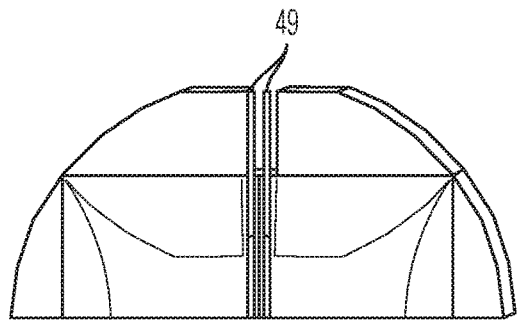
FIG. 9A is a simplified representation of a folding door in accordance with an aspect of the present invention.
Figure 10A:
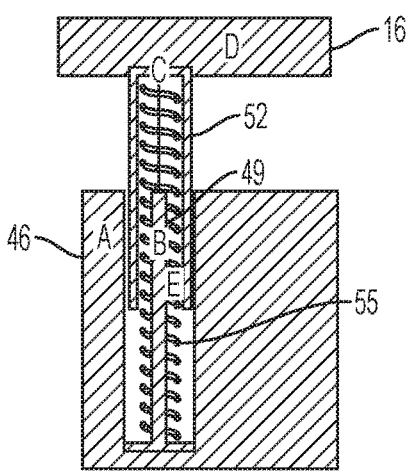
FIG. 10A and FIG. 10B are sectional views of simplified representations showing the engagement of the door shaft with a lower surface of the convertible protective shelter.
Figure 10B:
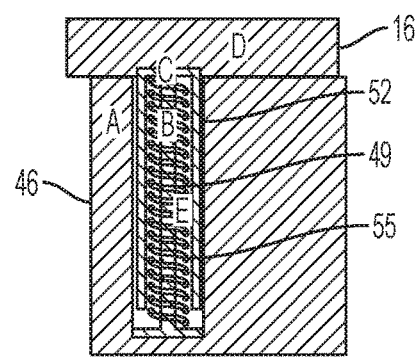

Referring to FIG. 9A, the protective door 46 may be generally provided with one or more spring fixed shafts 49, which can engage with the arched structure 14 (specifically with the lower surface 16), thereby resulting in the protective door 46 being installed thereon. FIG. 10A and FIG. 10B are sectional diagrams illustrating one possible configuration in which the protective door 46 may pivotably engage with the arched structure 14. A door shaft 52 is affixed to the underside of the lower surface 16 of the convertible protective shelter 10. The protective door 46 is provided with one or more spring fixed shafts 49, which are configured to matingly engage a corresponding door shaft 52. In addition, a strong spring 55 is affixed to the spring fixed shaft 49 and mounted on the door shaft 52. When the protective shelter is opened, the strong spring 55 exerts an upward force on the arched structure 14. Accordingly, the protective door 46, when so fully installed on a door shaft 52 (as shown in FIG. 10B), can rotate and pivot about the door shaft, allowing the protective door 46 to be opened and closed as needed.

Figure 12:
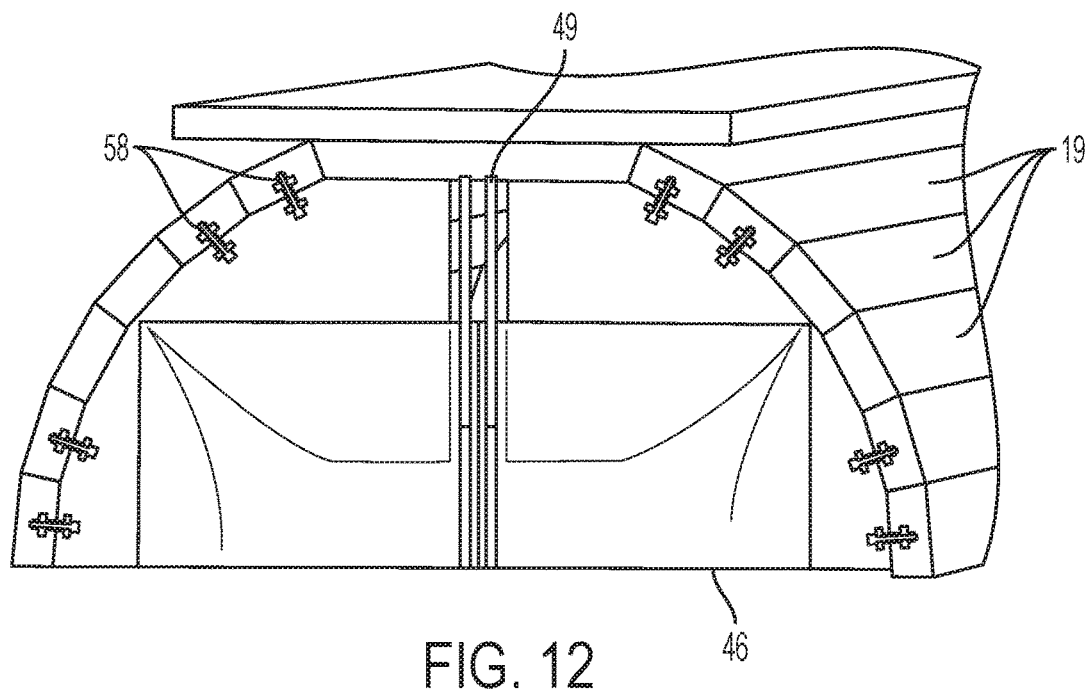
FIG. 12 is a simplified representation showing the engagement of the protective door with the support members in accordance with an aspect of the present invention.
Figure 13A:
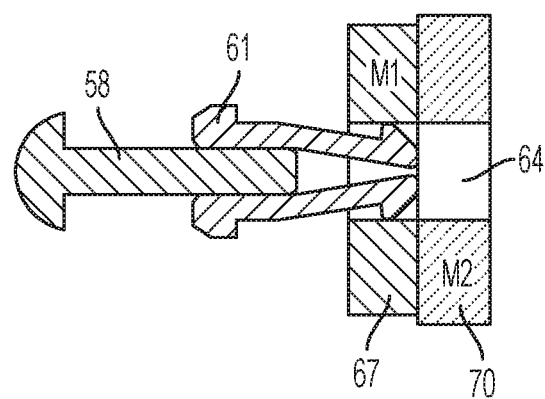
FIGS. 13A, 13B and 13C are sectional views of simplified representations showing the engagement of one of the fixed pins to secure the door with the support members in accordance with an aspect of the present invention.
Figure 13B:
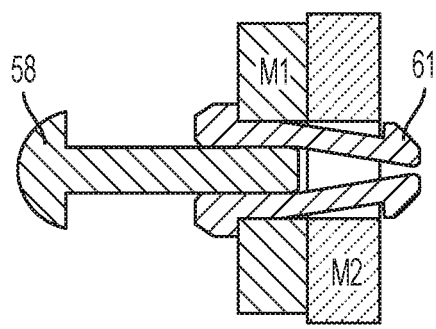
Figure 13C:
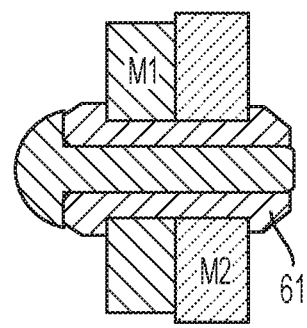

FIG. 12 is a diagrammatic representation illustrating the engagement of the protective door with the arched structure 14. In addition to the door shaft engagement mechanism described above, the protective door 46 may also be configured to be secured to one or more support members using one or more bidirectional fixed pins 58. The fixed pins 58 serve to maintain the protective door in place. Other securing means (such as bolts, latches, screw and nuts, or spring pins, etc.) are of course possible, and would be known to one skilled in the art. As shown, the plurality of fixed pins 58 are generally arranged around the periphery of the protective door, so as to engage the support members. FIG. 13 illustrates the operation of a fixed pin system in accordance with a preferred embodiment. The fixed pin 58 and anchor 61 operate to secure the protective door to one of the support members 19. A user may quickly install the fixed pins and anchors by hand. A fixed pin and an anchor are together pushed into a hole 64 connecting a portion of the protective door and the support member (the portion of the protective door and the support member are shown in FIG. 13 as M1 (67) and M2 (70) respectively, or vice versa). As the fixed pin 58 is pushed fully through the hole 64, it also pushes the anchor into position, thus securing the protective door and the support member (see FIG. 13C). When the protective shelter is deployed, and fixed pins are used to secure the protective door to the arched structure, in order to open the protective door, the user will generally first need to remove each of the fixed pins 58.

Figure 9B:
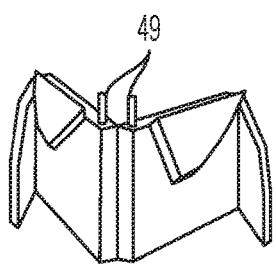
FIG. 9B is a simplified representation of the folding door shown in a partially folded position.
Figure 9C:
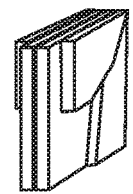
FIG. 9C is a simplified representation of the folding door shown in a fully folded position.
Figure 11:
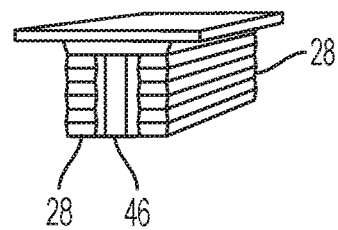
FIG. 11 is a perspective view of an embodiment of the convertible protective shelter in an undeployed position, shown with one or more doors stowed away in an undeployed position.

Referring back to FIGS. 9A, 9B and 9C, these show how the protective door 46 may be configured as a folding door, to facilitate the convenient storage of the protective door 46 when not in use (i.e. when the convertible protective shelter is in the undeployed position). FIG. 9A is a simplified representation of a folding door in accordance with an aspect of the present invention. The protective door is configured to be foldable along 2 orthogonal axes (the axes generally correspond to orthogonal chords lines for the arch of the protective door) in order to form a rectangular or square-shaped folded protective door, when the protective door is in a fully folded position. FIG. 9B is a simplified representation of the folding door shown in a partially folded position. FIG. 9C is a simplified representation of the folding door shown in a fully folded position. In this fully folded position, the protective door 46 may be conveniently stowed away between the leg structures 28 (see FIG. 11).

Although not specifically shown, the convertible protective shelter 10 may also be provided with one or more locks to help maintain the shelter in its undeployed and/or deployed position. For example, one or more buckles may be used to lock the protective shelter 10, so as to ensure the undeployed protective shelter (when functioning as a table) is not deployed inadvertently.

Optionally, the protective shelter may also be provided with air vents or holes (not shown) to ensure adequate air circulation/ventilation within the shelter. In addition, the protective door may optionally be provided with one or more viewing sections or view-holes (not shown), so that an occupant can see outside the deployed protective shelter.

I claim:

1. A convertible protective shelter, convertible from an undeployed position to a deployed position, the protective shelter in the undeployed position comprising:
    a top surface;
    a lower surface, affixed to the top surface and situated below the top surface, the lower surface having a first edge, and a second edge, the second edge diametrically opposite the first edge, wherein the top surface is only supported by the lower surface;
    a first leg structure comprising a plurality of first support members; and
    and a second leg structure comprising a plurality of second support members;
    wherein each of the first and second support members is elongate, is substantially uniform along its length, and has a cross-section that is substantially trapezoid-shaped,
    wherein a first upper support member of the plurality of first support members is pivotably connected to the first edge via an upper first hinged connection, and a second upper support member of the plurality of second support members is pivotably connected to the second edge via an upper second hinged connection,
    wherein each adjacent pair of first support members is pivotably connected via a respective hinged connection, and each adjacent pair of second support members is pivotably connected via a respective hinged connection,
    wherein each adjacent pair of hinged connections of the first leg structure are configured to alternate between being disposed on an inward-facing surface of the first leg structure, and being disposed on an opposite outward-facing surface of the first leg structure, and each adjacent pair of hinged connections in the second leg structure are configured to alternate between being disposed on an inward-facing surface of the second leg structure and being disposed on an opposite outward-facing surface of the second leg structure,
    wherein the protective shelter is configured to convert from the undeployed position to the deployed position via pivotal rotation of the first support members about the first hinged connection and their respective hinged connections, and via pivotal rotation of the second support members about the second hinged connection and their respective hinged connections, thereby forming, together with the lower surface, a substantially arch-shaped arched structure, and
    wherein the arched structure defines a shelter space therebelow.

2. The convertible protective shelter of claim 1, additionally comprising: a first tensioning means configured to bias the lower surface with the first upper support member; a second tensioning means configured to bias the lower surface to the second upper support member, and a plurality of tensioning means configured to bias each pair of adjacent support members to each other.

3. The convertible protective shelter of claim 1, additionally comprising at least one protective door pivotably engaged with the lower surface and situated below the arched structure, wherein the protective door is configured, when in a closed position, to close off one entrance to the shelter space, and when in an open position, to allow entry into and exit from the shelter space.

4. The convertible protective shelter of claim 3, wherein the protective door is substantially arch shaped.

5. The convertible protective shelter of claim 3, additionally comprising a plurality of securing means for affixing the protective door to one or more of the support members.

6. The protective shelter of claim 3, wherein when the shelter is in an undeployed position, the protective door is configured to be stowable under the lower surface and between the leg structures.

7. The protective shelter of claim 6, wherein the protective door is a folding door, configured to be foldable.

8. The protective shelter of claim 7, wherein the folding door is configured to be foldable along one or more axes, the axes corresponding to orthogonal chord lines of the protective door.

9. The convertible protective shelter of claim 1, wherein the top surface and lower surface are integral with each other.

* * * * *